United States Patent [19]

Kipp, Jr.

[11] 4,414,335

[45] Nov. 8, 1983

[54] COMPOSTING SYSTEM WITH MOVABLE PROCESS CARS

[75] Inventor: Carl E. Kipp, Jr., South Charleston, Ohio

[73] Assignee: Paygro, Inc., South Charleston, Ohio

[21] Appl. No.: 333,733

[22] Filed: Dec. 23, 1981

[51] Int. Cl.³ .............................................. C12M 1/04
[52] U.S. Cl. .................................. 435/313; 422/184; 71/9
[58] Field of Search ............... 202/227, 262; 422/111, 422/112, 114, 184; 71/9, 12; 435/290, 313; 414/342, 351

[56] References Cited

U.S. PATENT DOCUMENTS

| | | | |
|---|---|---|---|
| 3,837,810 | 9/1974 | Richards et al. | 71/9 |
| 3,853,480 | 12/1974 | Kaelin | 71/9 X |
| 4,046,689 | 9/1977 | Argyll | 71/12 |
| 4,139,640 | 2/1979 | Kipp, Jr. | 71/9 |

*Primary Examiner*—Ferris H. Lander
*Attorney, Agent, or Firm*—King and Liles

[57] ABSTRACT

A method and apparatus for aerobically thermophilically processing organic waste material utilizes a series of movable process cars which enhance the environment for thermophillic bacteria growth. The process cars are designed to receive material at a first location and discharge it at a second location after maintaining the material for a predetermined time and promoting it decomposition.

27 Claims, 11 Drawing Figures

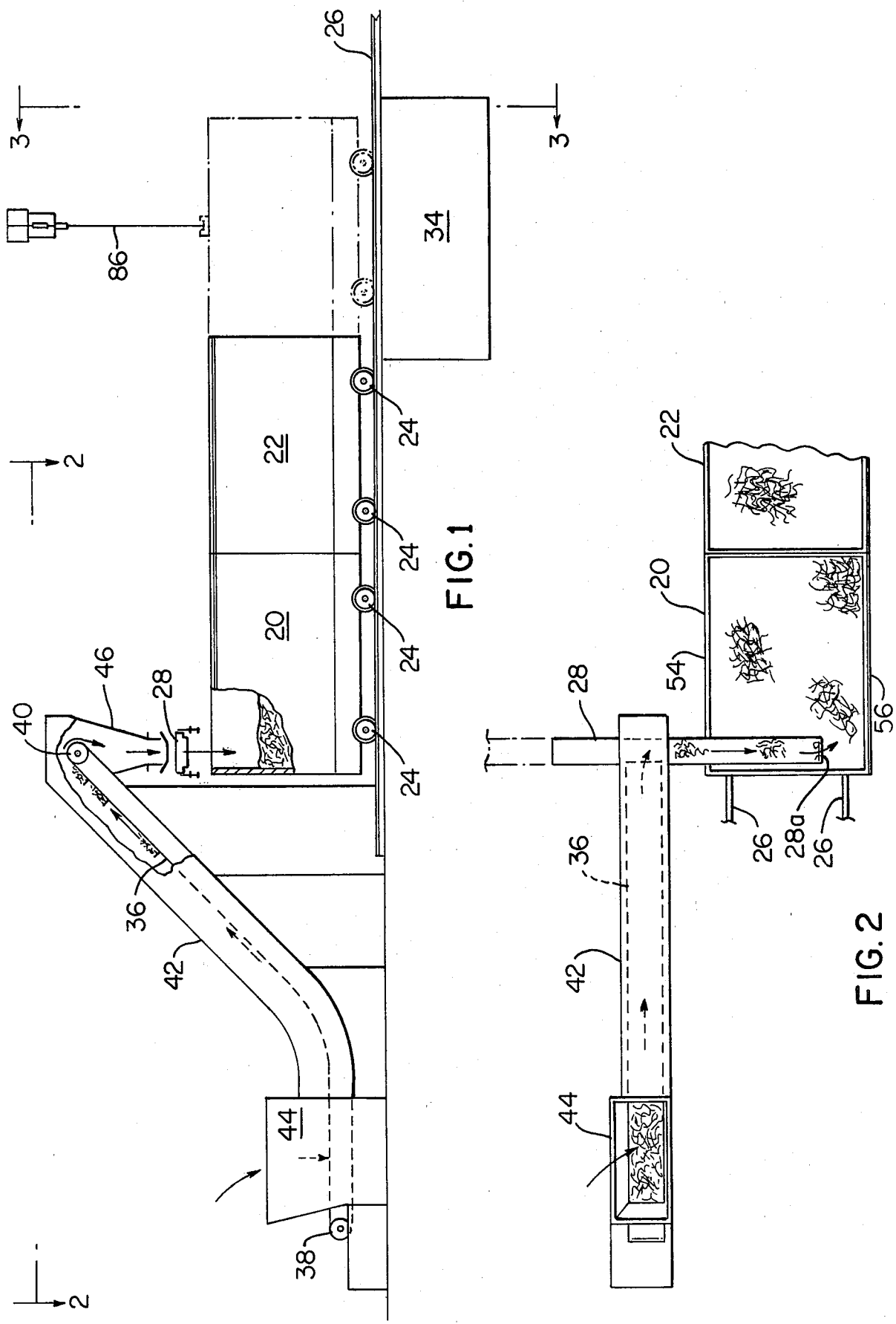

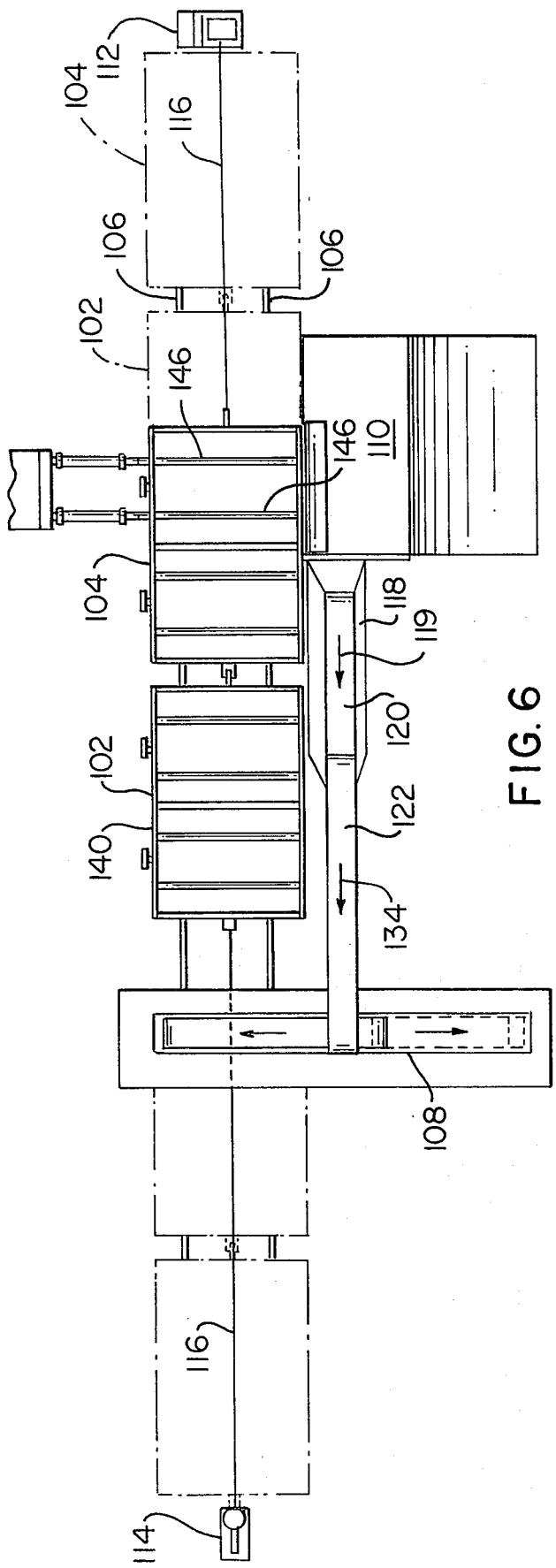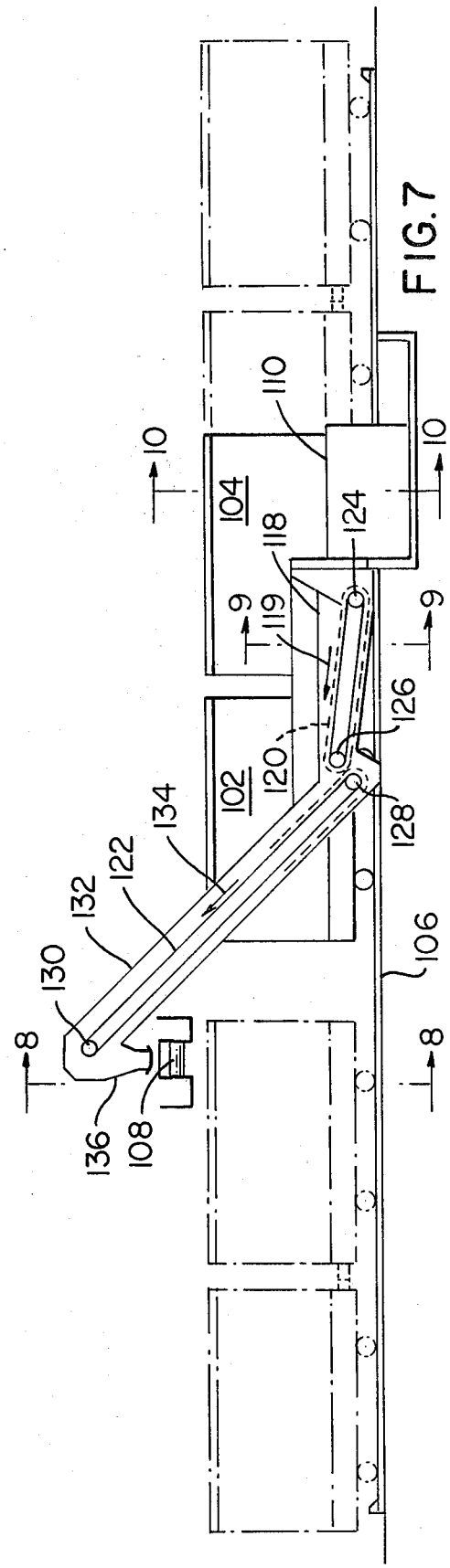

COMPOSTING SYSTEM WITH MOVABLE PROCESS CARS

BACKGROUND

The present invention relates to aerobic decomposition of animal and other organic waste, such as sewage sludge, and more particularly concerns a method and apparatus which utilizes movable process cars which permit the aerobic thermophilical composting of organic waste material within a limited area.

It is known that organic waste material may be efficiently processed by providing an environment which enhances the growth of thermophilic bacteria in the waste product. One such process for aerobically decomposing organic waste material is disclosed in applicant's U.S. Patent 4,139,640. According to the method in this mentioned patent, a quantity of undecomposed organic waste material is introduced into one end of an elongate composting vessel. This quantity of material is maintained in the vessel until the material attains a predetermined thermophilic temperature. This quantity of material is then agitated, intermixed and advanced into a succeeding station in the elongate composting vessel toward the opposite end of the vessel. The quantity of material is then once again maintained in a quiescent state until a succeeding quantity of material deposited at the end of the vessel vacated by the advanced quantity of material reaches a predetermined thermophilic temperature. Each quantity of material is repeatedly and intermittently mixingly advanced to a succeeding station and maintained in a quiescent state until the last deposited quantity reaches a predetermined thermophilic temperature. This process is continued until the quantity of material is ultimately discharged from the composting or containing vessel.

The method described in the above identified patent has proved to be highly effective. It does, however, suffer from limitations of size for some small scale applications. The present invention overcomes not only the disadvantages as to size, which were heretofore believed necessary to successfully carry out the process, but also greatly reduces the cost of process equipment for small scale operations, much of which was necessitated by the large elongate vessel.

It is therefore an object of the present invention to provide a method and apparatus for effecting the aerobic thermophilic bacterial composition of organic waste materials for small scale operations.

It is a further object of the present invention to reduce the space requirements for processing equipment of aerobic thermophilic composting of organic waste material.

It is a further object of the present invention to provide a method and apparatus for economically aerobically thermophilically composting organic waste material.

It is yet another object of the present invention to provide a method and apparatus for aerobically thermophilically composting waste material in which the capacity of the system may be readily expanded or contracted.

SUMMARY OF THE INVENTION

In accordance with the invention, an apparatus for processing organic waste material is provided. This apparatus includes a movable containment vessel for organic waste material which is movable from a first loading station in which it receives the organic waste material to a second station in which it discharges the same material after the material has undergone partial decomposition. While holding material, the apparatus has means for introducing pressurized air into the organic waste material contained in the vessel to enhance the growth of thermophilic bacteria. The invention also includes means for discharging the organic waste material from the movable containment vessel to a temporary storage facility when the containment vessel is positioned at its second location and after the material has undergone partial decomposition. The apparatus also includes means for transferring organic waste material from the temporary storage facility into the movable containment vessel while the vessel is positioned at the first loading station.

In accordance with a further aspect of the invention, the containment vessel is supported on a track for movement between the first and second stations.

A further aspect of the invention includes rollably moving the process car between the first and second stations on the track.

According to another aspect of the invention, the containment vessel is a process car with a base portion and a movable containment portion supported thereon. At least a portion of the containment portion of the vessel is movable relative to the base for discharging organic waste material from the process car.

Another aspect of the invention includes means for pivotally moving the containment vessel relative to the base for discharging organic waste material from the process car.

Yet a further aspect of the invention includes a hoist positioned above the process car and connected thereto. This hoist is preferably movably mounted upon a rail extending over the process car in transverse relation to the track. The hoist preferably has a cable which is retractably connected to the process car.

In accordance to still a further aspect of the invention, the containment portion of the vessel includes two end walls and two parallel side walls, each of them perpendicular to the end walls. The side walls preferably extend substantially parallel to the track.

A still further aspect of the invention includes a process car which is pivotally mounted to the base proximal to one of the side walls. This side wall is hingingly secured to the end walls for opening when the containment portion of the vessel is pivotally moved relative to the base portion.

Another aspect of the invention includes a containment vessel which is pivotally connected to the base portion proximal to the bottom of the containment portion of the vessel with one side wall hingingly secured to end walls proximal to the top of the containment portion.

The invention also includes in one of its aspects, an elevating conveyor for moving the organic waste material from the temporary storage facility into the movable containment vessel.

A further specific aspect of the invention includes a storage hopper positioned below the most elevated position of the elevating conveyor with the elevating conveyor extending through the storage hopper for removing organic waste material deposited therein and transporting it toward the process car.

A still further aspect of the invention includes a shuttle conveyor for receiving waste material from the elevating conveyor and being reciprocally movable toward and away from the process car for depositing organic waste material therein. The shuttle conveyor is preferably in substantially perpendicular relationship with the track with a variable discharge position through a zone defined by the vertical planes of the side walls of the process car when the process car is located at the loading station.

In accordance with an additional aspect of the invention, the containment portion of the process car includes a perforated false bottom with a layer of gravel supported thereon and an open chamber disposed beneath the perforated false bottom. One aspect of the invention also provides for introducing pressurized air through an air conduit extending into the open chamber and communicating the pressurized air through the perforations in the false bottom and into the organic waste material in the process car.

According to a more specific aspect of the present invention, the process car includes two end walls which are spaced approximately twenty feet apart with two parallel side walls spaced approximately fourteen feet apart which are mutually perpendicular to the end walls. The side walls preferably extend substantially parallel to the track.

Yet another aspect of the invention includes a way system upon the base of the process car with one of the side walls being movable toward the opposite side walls while maintaining a substantially perpendicular relationship to both the base and the end walls. In a specific form of the invention, a piston cylinder arrangement is disposed alongside the track opposite the temporary storage facility which is operative to move this one side wall toward the opposite side wall.

In accordance with yet another aspect of the invention, a method of aerobically thermophilically decomposing organic waste material includes charging the open top process car with a predetermined quantity of organic waste material while the process car is located at the first location. The organic waste material is maintained in the process car in a quiescent state for a predetermined period. Pressurized air is introduced through a perforated bottom in the process car and into the organic waste material contained therein to enhance the growth of thermophilic bacteria. The process car is transferred to a second location and discharged into a temporary storage facility. This discharging agitates and intermixes the waste material which is then transported to the first location and recharged in a process car at that first location. The process is repeated until the waste material is sufficiently composted to an odorless and harmless product.

According to a further aspect of the invention, additional organic waste material is intermixed with the material discharged from the process car prior to recharging a process car. Another and more specific aspect of the invention includes adding a predetermined quantity of additional material which corresponds to the shrinkage in the waste material which occurs in the process car prior to discharge therefrom.

In accordance with another specific aspect of the invention, the waste material is maintained in the process car in a quiescent state until a thermophilic temperature of at least 140° is reached.

A still further aspect of the invention includes transporting the agitated and intermixed material to the first location by depositing the material into a storage hopper with a moving conveyor extending therethrough and removing the material from the storage hopper on this moving conveyor. In accordance with a still further and specific aspect of the invention, a plurality of conveyors are used.

In yet another aspect of the invention, the charging and recharging of the process cars includes varying the discharge location of a conveyor discharging waste material into the discharge car.

An additional aspect of the present invention includes discharging material from the conveyor extending through the hopper onto an elevating conveyor and transporting the material on the elevating conveyor to a shuttle conveyor.

BRIEF DESCRIPTION OF THE DRAWINGS

Other objects and advantages of the invention will become apparent upon reading the following detailed description and upon reference to the drawings, in which:

FIG. 1 is a schematic depiction of a side elevational view of one embodiment of the invention.

FIG. 2 is a plan view, taken along line 2—2 in FIG. 1 illustrating an indexable conveyor discharging organic waste material into movable process cars.

FIG. 6 is a schematic depiction of a plan view of another embodiment of the present invention.

FIG. 7 is a side elevational view of the embodiment of FIG. 6.

Figure 3:
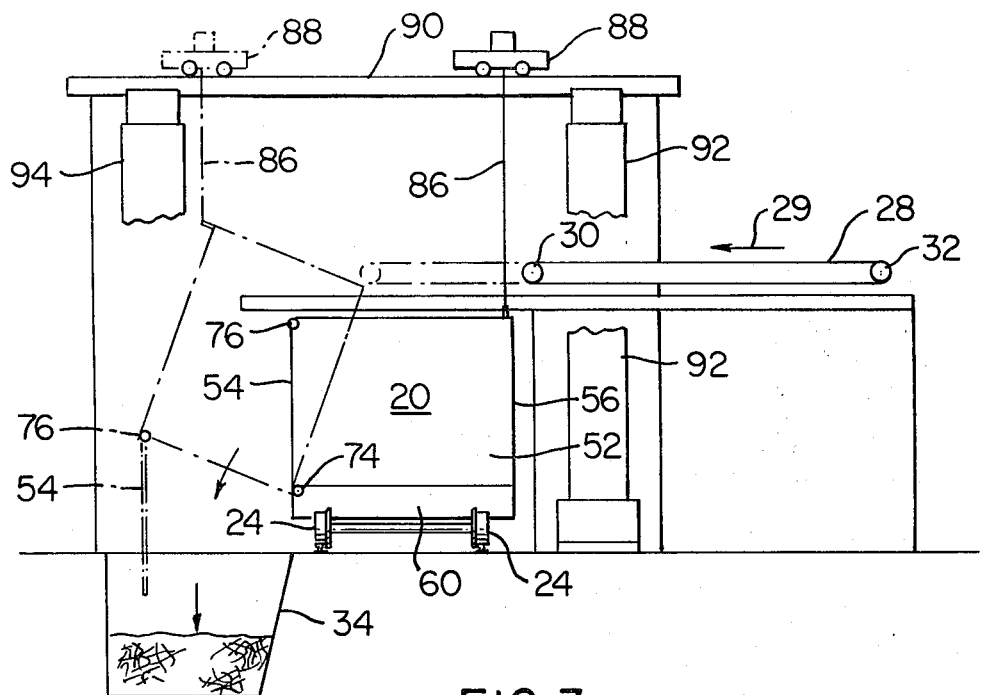
FIG. 3 is an end view, taken along line 3—3 of FIG. 1, depicting one of the process cars illustrated in FIG. 1 discharging organic waste material into a discharge pit.

While the invention will be described in connection with the preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

DETAILED DESCRIPTION OF THE PREFERRED EMBODIMENTS

Referring now to the drawings, an overview of the first illustrated embodiment is best realized from a viewing of FIG. 1. FIG. 1 depicts a pair of movable containment vessels shown as process cars 20 and 22 joined together at their ends for common tandem movement.

Each of these process cars 20 and 22 are movably mounted atop a plurality of wheels, collectively identified by the numeral 24. The wheels 24 are rollable along a pair of parallel tracks 26, with one member of each pair of wheels 24 rolling upon one of the tracks 26.

As illustrated in FIG. 1 and in the solid lines of FIG. 2, the first (20) of this pair of process cars 20 and 22 has one end positioned beneath an end 28a of an indexable shuttle conveyor 28. This indexable shuttle conveyor 28 is supported upon a plurality of rollers, including illustrated end rollers 30 and 32 depicted in FIG. 3. These rollers, including several rollers in addition to the illustrated rollers 30 and 32, are rotatably secured to a nonillustrated frame in a manner well known in the art. The indexable shuttle conveyor 28 is adapted for continuous movement with respect to its frame about the end rollers 30 and 32 in a direction which is generally perpendicular to the plane of the illustration of FIG. 1. This direction of movement is illustrated by the arrow 29 in FIG. 3. In addition to the continuous movement of conveyor 28 with respect to its frame in the direction of arrow 29, the frame itself is reciprocally movable in the same direction. This reciprocal shuttle movement of the conveyor 28 is best illustrated with a comparison of its solid and phantom line positions depicted in the plan view of FIG. 2 (also seen in FIG. 8 in connection with the second illustrated embodiment). The retracted position of the conveyor 28 is also illustrated in FIG. 3.

Referring once again to FIG. 1, it is seen that the tracks 26 extend from a position beneath the indexable shuttle conveyor 28 to a location alongside a temporary storage facility illustrated as discharge pit 34. The process cars 20 and 22, which are rollingly movable on these tracks 26, are thus movable from a first loading range or station, in which the process cars are disposed beneath the indexable shuttle conveyor 28 for receiving material discharged from the end 28a thereof, to a second or discharge station in which the material previously received from the indexable shuttle conveyor 28 is discharged from the process cars 20 and 22 into the discharge pit 34.

Material is supplied to the indexable shuttle conveyor 28 from an elevating conveyor 36, which is an endless belt span across a plurality of rollers positioned between illustrated end rollers 38 and 40. These rollers (including nonillustrated rollers between the rollers 38 and 40) are rotatably secured to a nonillustrated frame. This nonillustrated frame is disposed inside a conveyor enclosure 42 which extends from a "live bottom" hopper 44 (a hopper with a moving conveyor for its bottom) to a downwardly direction housing chute 46. The elevating conveyor 36 is positioned alongside the shuttle conveyor 28 with the lower end (about end roller 38) of the elevating conveyor 36 disposed beneath the elevation of the shuttle conveyor 28 and the upper end (about end roller 40) disposed directly above for depositing organic waste material thereon. The "live bottom" hopper 44 is located below the most elevated end 40 of the elevating conveyor 36 with the conveyor 36 serving as the bottom or floor of hopper 44. The elevating conveyor 36 has a continuous movement which is generally perpendicular to the movement of the shuttle conveyor 28 and parallel to the movement of the process cars 20 and 22 upon tracks 26.

Raw sludge, which may contain solid waste products from humans or livestock, and other organic materials such as animal bedding, straw, corncobs, straw dust, bark and the like, is deposited into the "live bottom" storage hopper 44 by means of a front end loader (not shown in FIG. 1, however, see loader 152 in FIG. 9) or other suitable piece of equipment. The elevating conveyor 36 extends through the hopper 44 subjacent to the hoppers contents to form a "live" movable bottom therein. This elevating conveyor thus receives the sludge deposited in the "live bottom" hopper 44, transporting and elevating the material to the discharge end of the elevating conveyor about end roller 40. Once the elevating conveyor 36 rounds the end roller 40, its direction is reversed and subjacent support of the sludge material supported on the surface of the conveyor 36 is terminated. The sludge material is then permitted to undergo free falling gravity bias movement through the housing chute 46 onto the top of indexable conveyor 28.

As mentioned above, the shuttle conveyor 28 has a continuous rotating movement in a direction perpendicular to the elevating conveyor 36 for receiving the sludge material discharged from the elevating conveyor 36 and transporting it above one of the process cars 20 and 22 positioned at the loading range area. As depicted from the phantom lines in FIG. 2 (and more clearly in the illustration of FIG. 8), the entire shuttle conveyor 28 is indexably movable with its frame to vary the position of the discharge end 28a within a zone defined by the vertical planes of the side walls 54 and 56 of the process cars 20 and 22 when these process cars are located at the loading station. This variable position of the discharge end 28a of the conveyor 28 permits even distribution of the sludge material in the process cars 20 and 22 from side to side. With this indexable shuttle movement of the discharge end 28a, the centralized heaping which often results from discharging material from a fixed location is avoided. Even end to end distribution of the sludge material in the process cars 20 and 22 is promoted by advancing the cars 20 and 22 in end to end direction along the track 26 as the shuttle conveyor 28 is being moved from side to side of the process cars 20 or 22 to evenly discharge the sludge material into the process cars 20 and 22.

As the first process car 20 is uniformly filled to a predetermined height, which in the preferred embodiment would be ten feet, the second process car 22 is advanced along the tracks 26 to the fill zone where it is uniformly filled in a similar fashion. The use of such individual process cars such as 20 and 22 is advantageous in that, as will be more readily apparent hereinafter, the system may be readily expanded or reduced in size by adding or subtracting individual process cars.

Figure 4:
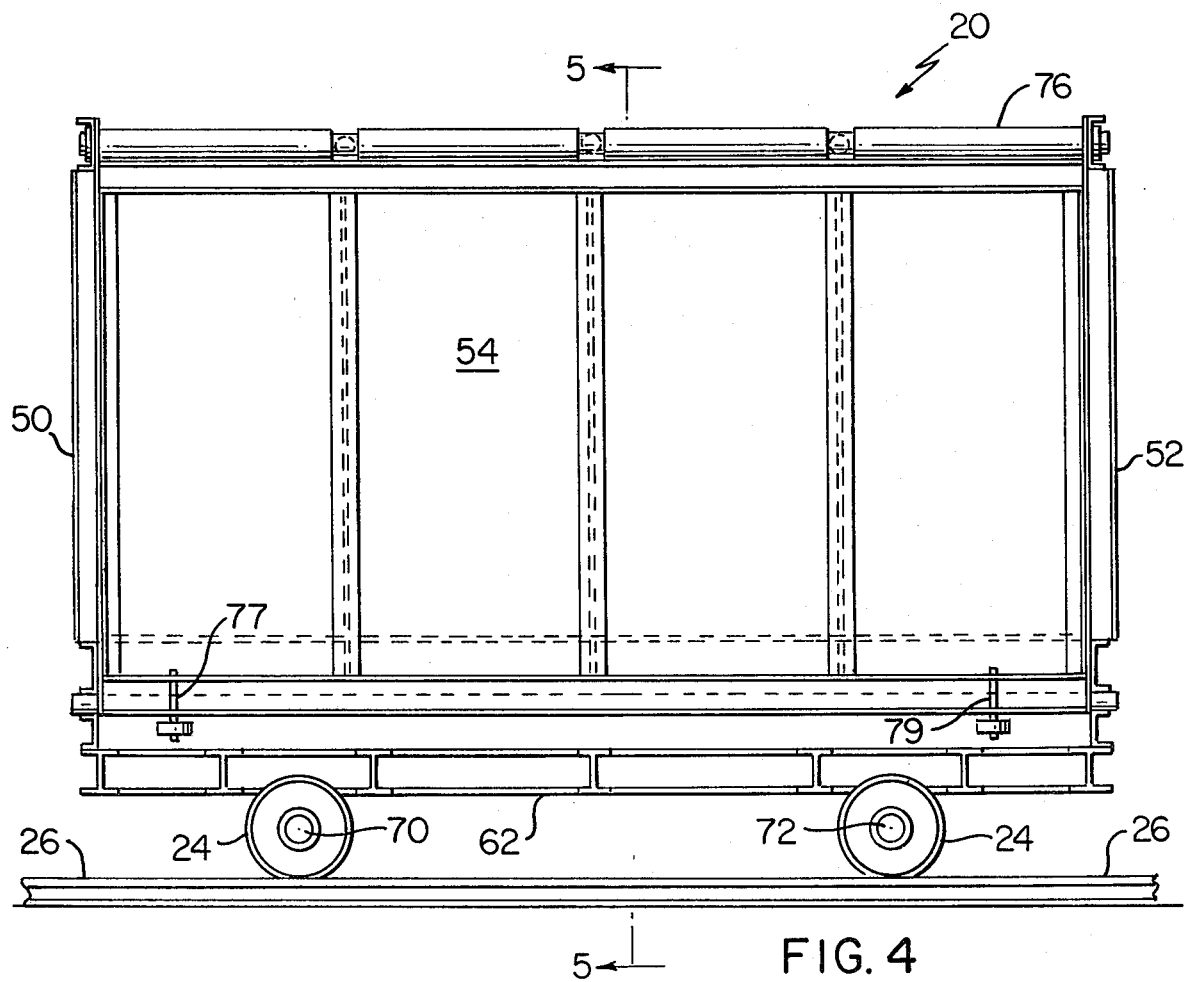
FIG. 4 is a side elevational view, partially in cross section, of one of the process cars of FIGS. 1-3.
Figure 5:
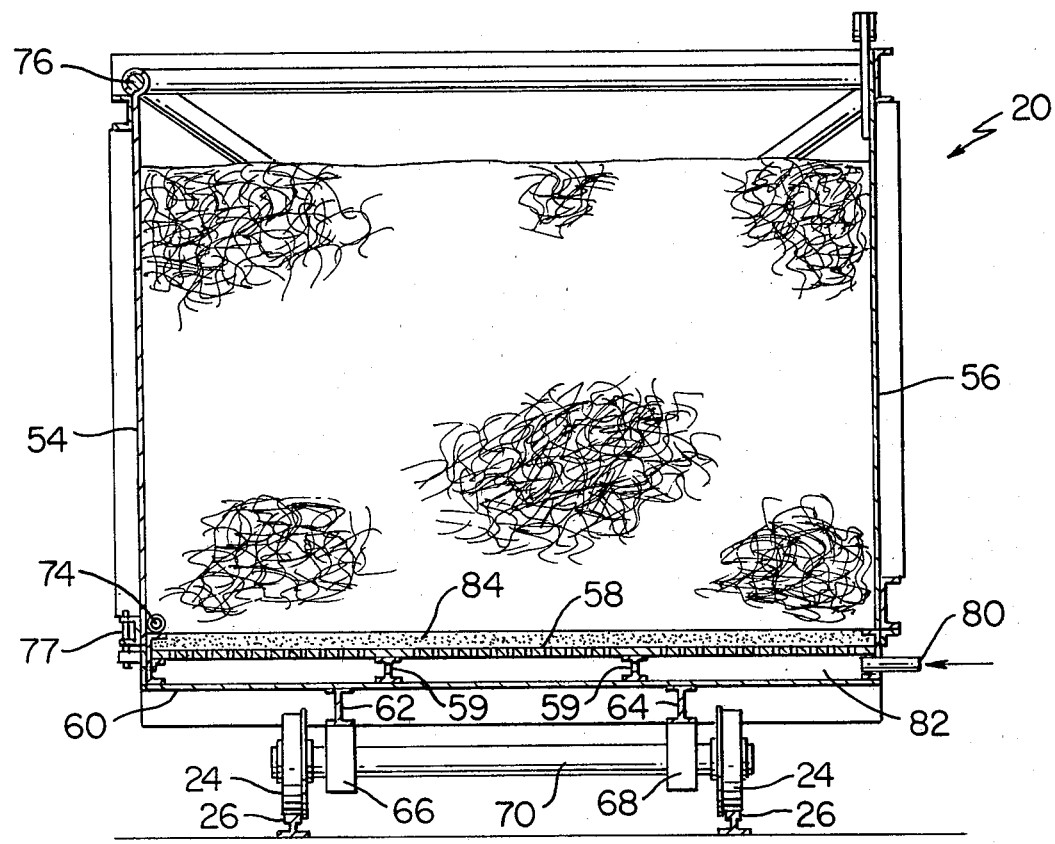
FIG. 5 is a cross sectional view of the process cars of FIG. 4, taken along line 5—5 of FIG. 4, depicting structure for introducing pressurized air beneath a false bottom of a process car and into the organic waste material contained therein.

The process cars 20 and 22 and their operation, are depicted most clearly in FIGS. 3, 4 and 5. Since both of the process cars 20 and 22 are identical, only the first process car 20 will be described in detail. Process car 20 has a pair of spaced parallel end walls 50 and 52 which are joined by a pair of spaced parallel side walls 54 and 56 so as to jointly form an open top rectangularly shaped enclosure. The end walls 50 and 52 of the preferred embodiment are approximately twenty feet apart while the interior surfaces of side walls 54 and 56 are separated by twelve feet. The side walls 54 and 56 extend in substantially parallel relationship to the tracks 26.

A perforated steel floor or false bottom 58 spans the distance between both the pair of end walls 50 and 52 and the pair of side walls 54 and 56 and is secured to both of these pairs of walls. This perforated false bottom 58 is supported by a series of spaced I-beam supports 59 resting upon a base portion 60 of the process car 20 and interposed between the base portion 60 and the perforated steel floor 58. The base portion 60 is, itself, supported by a pair of I-beams 62 and 64 which are secured to bearings 66 and 68 respectively. An axle 70 is rotatably journaled in the bearing 66 and 68 with wheels 24 affixed to the ends of the axle 70. FIG. 5 depicts two of the wheels 24 riding atop the pair of tracks 26. A second axle 72 is similarly supported at the opposite end of the process car 20 and illustrated in FIG. 4.

As seen from the illustration of FIG. 3, the rectangular shaped enclosure of the process car 20 defined by end walls (50, 52), side walls (54, 56) and the perforated floor 58 forms a containment portion which is pivotally mounted to the base portion 60. The pivoting movement of the containment portion is effectuated about pivotal axis 74, located proximal to the juncture of side walls 54 and perforated floor 58. As also seen from the illustration of FIG. 5, the side wall 54 functions as a hinged door whenever the enclosure is pivoted about pivotal axis 74. The top of the side wall 54 is pivotally attached to hinge axis 76 located proximal to the containment portion, and, when the bottom of side wall 54 is unsecured relative to the false bottom 58, the weight of the sludge material in the process car 20, as well as the weight of the side wall 54 itself, will cause the side wall 54 to pivot about pivotal axis 76, permitting discharge of the sludge material from the process car. A pair of latch members 77 and 79 are affixed to the bottom of the side wall 54 for selective securement of that side wall 54 to the base portion 60 for securement at all times other than during the dumping procedure. When these latches 77 and 79 are in their operative lock position, they will prevent pivotal movement of the side wall 54 about the pivotal axis 76.

Once the process cars 20 and 22 are uniformly filled or charged to a predetermined level of approximately ten feet by the material discharged from the shuttle conveyor 28, the charge of waste material in each of the process cars 20 and 22 is maintained in a quiescent condition until it reaches a thermophilic temperature of approximately 140° F. In order to enhance and augment the growth of thermophilic aerobic bacteria in the organic sludge material undergoing decomposition, pressurized air is introduced into the process car contents. This air is introduced through an inlet conduit 80 (FIG. 5) into a chamber 82 defined by the perforated steel floor 58 of the process car 20 and the base member 60. Pressurized air enters the chamber 82 and passes through the perforations of the false bottom 58. A layer or bed 84 of washed gravel is supported atop the perforated floor 58. This layer or bed 84 has a depth of approximately three inches in the preferred embodiment and serves to prevent the decomposing sludge material in the process car 20 from contacting the perforated floor 58.

After the organic waste material in the process cars 20 and 22 obtain the desired thermophilic temperature of approximately 140°–185° F., the process cars 20 and 22 are moved along tracks 26 to a discharge location alongside the discharge pit 34. Alternatively, the process cars 20 and 22 can be moved prior to reaching the desired thermophilic temperature after their charging from shuttle conveyor 28. Regardless of when process cars 20 and 22 are moved, dumping of these process cars does not occur until the desired thermophilic temperature of the organic waste material is obtained. The operation at the discharge pit 34 is best illustrated in FIG. 3.

As shown in FIG. 3, a cable 86 is secured to the side 56 of the process car 20 distal to the discharge pit 34. The opposite end of this cable 86 is secured to a trolley mounted hoist 88. This hoist 88 is rollable along an elevated trolley or track 90 which passes over the process car 20 at the location of the discharge pit 34, spanning a pair of vertical supports 92 and 94 on opposite sides of the pair of tracks 26, proximal to the discharge pit 34. The trolley track 90 extends transversely and perpendicular to the pair of tracks 26. As the hoist 88 is moved along trolley track 90 toward the discharge pit 34, the hoist 88 also retracts and shortens the cable 86. Both the movement of the hoist 88 along the track 90 toward the discharge pit 34 and the retraction of cable 86 force the process car 20 to rotate about the process car's pivotal axis 74 to a dumping position. This dumping position is depicted in the illustration of FIG. 3 in phantom lines wherein the weight of the side door 54, as well as the weight of the process car contents, is shown forcing the opening of side door 54 about its hinged attachment to end walls 50 and 52 of the process car 20. The hoist thus serves as a means for pivotally moving the containment portion of the process car relative to the base portion. As will be readily apparent from the aforementioned phantom line depiction of the dumping position of the process cars in FIG. 3, the solid waste material is discharged from the process car 20 into the discharge pit 34 when this dumping position is achieved.

Prior to the time the process car 20 is discharged into the discharge pit 34, the partial decomposition and drying of the organic sludge waste material in the process cars will result in shrinkage of the sludge material with a resultant reduction in the height of the charge in the process cars. This discharge or dumping of the partially decomposed material will inherently cause that material to be agitated, intermixed and more fully mixed with the ambient air. This discharge material is then removed from the discharge pit 34 by a front end loader, for example, and transferred back to the hopper 44 where the process is repeated. The process car 20 is moved from the discharge location back to the first loading area after dumping into the discharge pit 34 to once again receive the reprocessed material from the shuttle conveyor 28.

As mentioned above, the charge of organic waste material will shrink during the decomposition process. It is thus desirable to add the contents of another process car or to intermix new undecomposed material to the partially decomposed charge as it is recharged into the process car 20. This will bring the height of the process car contents to the same predetermined level which was used in the initial charging. In addition to increasing the capacity of the system, the efficiency of the process is increased by maintaining the original mass, thus reducing the per unit heat loss to assist in maintaining the desired thermophilic temperatures. It would, of course, also be possible to reduce the size of the process car, by a partition or movable wall or the like, while maintaining the height of a recycled charge of partially decomposed organic waste material.

FIG. 6 and FIG. 7 are top plan and elevational views respectively of a second preferred embodiment of the present invention. This second embodiment is also illustrated with two joined process cars 102 and 104 which are rollingly supported upon a pair of parallel tracks 106. These tracks 106 extend from a first loading zone beneath an indexable shuttle conveyor 108 to a car discharge location adjacent a discharge pit 110. A winch 112 and a cooperating pulley 114 are positioned at opposite ends of the track 106. A cable 116 is attached to the opposite outside ends of the joined process cars 102 and 104 about both the pulley 114 and the winch 112 for moving the process cars 102 and 104 back and forth along track 106 under the control of the winch 112.

A "live bottom" hopper 118 with a conveyor 120 extending therethrough is disposed adjacent the car discharge pit 110. The conveyor 120 extends in a direction generally parallel to the tracks 106 and serves to transport sludge material deposited in the hopper 118 in a direction corresponding to arrow 119 to an elevating conveyor 122. The conveyor 120 extending through the "live bottom" hopper 118 spans substantially the entire width of the hopper (perpendicular to the direction of conveyor movement) over a plurality of rollers spaced between end rollers 124 and 126. After material on conveyor 120 is passed over end roller 126, it is discharged onto the elevating conveyor 122. The elevating conveyor 122 is supported by a plurality of rollers disposed between end rollers, end rollers 128 and 130 in the case of conveyor 122. The supporting rollers are, in turn, rollingly supported in a nonillustrated frame. The entire frame (nonillustrated) is disposed within a conveyor enclosure or housing 132. When deposited onto the elevating conveyor 122, the sludge material is transported in a direction corresponding to arrow 134 to an elevated position over end roller 130. After passing over the end roller 130, subjacent support for the material is terminated and free falling gravity bias movement through chute 136 onto indexable conveyor 108 is permitted.

Once the organic sludge material is deposited onto the indexable conveyor 108, the conveyor is moved from its retracted position to a position in which the discharge end is vertically disposed over the process car 102 near the cars (102) most distal side wall 140. As the conveyor 108 is continuously rotating and discharging the sludge material on its surface, the discharge end position of the conveyor 108 is gradually moved from that depicted as 108a to that depicted as 108b in FIG. 8. As with the first disclosed embodiment, this variable position of the discharge end of the indexable conveyor 108 avoids centralized heaping of the material in the process car 102. Similarly, as in the previously described embodiment, the process car is moved along tracks 106 during the loading procedure to enhance even end to end distribution of the organic waste material in the process car 102.

Figure 8:
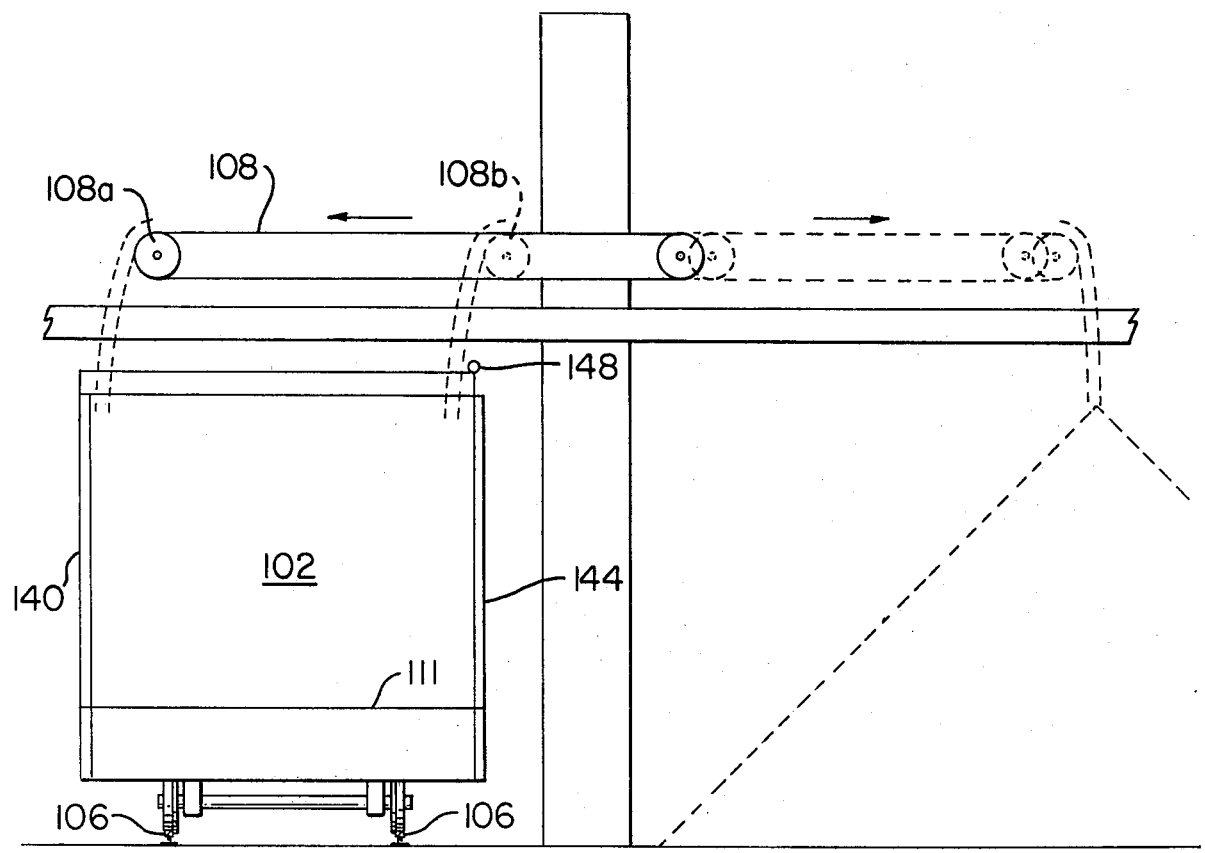
FIG. 8 is a sectional view taken along line 8—8 of FIG. 7 depicting the various positions of an indexable conveyor discharging material into a process car.

The process cars 102 and 104 have perforated steel floors and means for introducing pressurized air into the organic waste material contained in the car which is identical to that disclosed in the embodiment of FIG. 5. Similarly, the perforated floors in these process cars 102 and 104 support a layer of washed gravel, the gravel layer being about three inches in depth. Perforated floor 111 in process car 102 is shown in FIG. 8.

Figure 10:
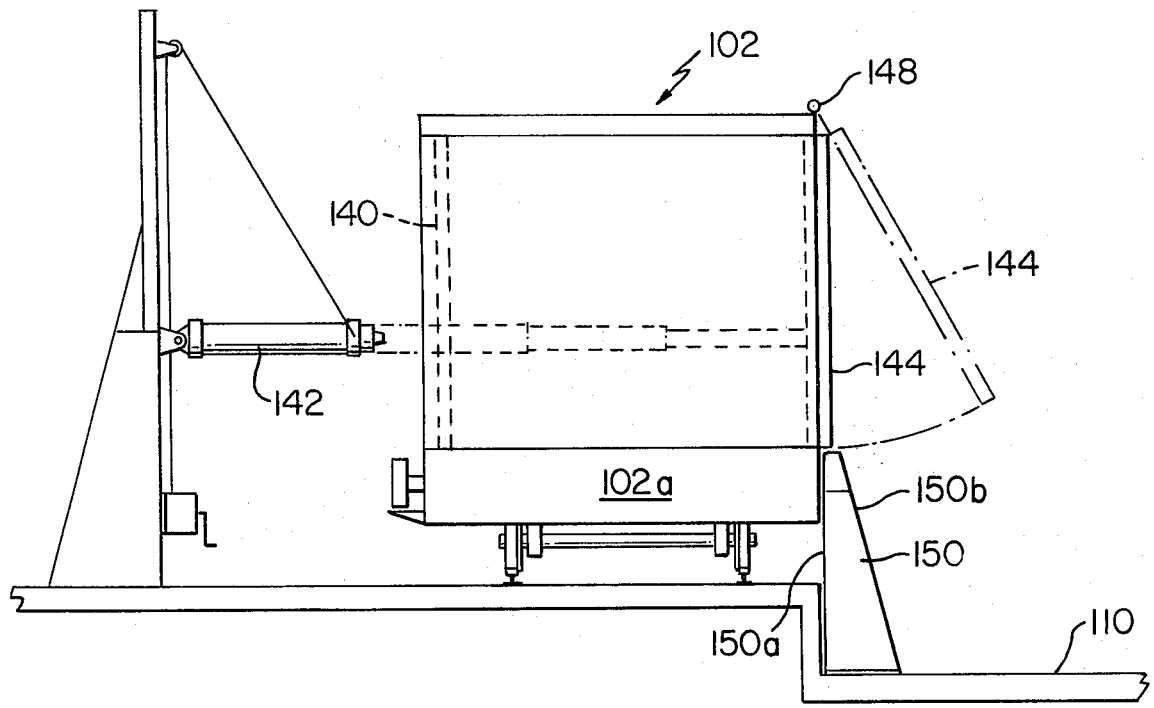
FIG. 10 is a sectional view taken along line 10—10 in FIG. 7 depicting the movement of both side walls of one of the process cars of FIG. 6-9 as organic waste material is discharged to a discharge pit.

The process cars 102 and 104 differ from those previously described (process cars 20 and 22) in their discharge operation for the organic waste material. As shown in FIG. 10, the process car 102 has a false side wall 140 which is movable under the impetus of a pair of car discharge cylinders 142 for a dumping operation. This false wall 140 moves toward the opposite side wall 144 along a way system 146 shown in FIG. 6 (which includes a pair of I-beams secured to the base portion 102a of process car 102) maintaining its substantially perpendicular relationship to both the perforated false bottom 111 and base portion 102a during the movement for the dumping operation. When the process car 102 is filled with organic waste material, this waste material, the false side wall 140 movement pushes the waste material, which in turn, pushes the opposite side wall 144 about its hinged pivotal axis 148 to swing the side wall 144 to an open position. When this side wall 144 is so open, the organic waste material in process car 102 is pushed out of the car and dumped into discharge pit 110. Side wall 144 is shown in a partially open position in the phantom line depiction of FIG. 10.

A car buffer 150 is positioned proximal to the side of the process cars 102 and 104 when they are positioned at the discharge position. The car buffer 150 extends vertically to a height above the process cars 102 and 104 but below the pivotal side wall 144. Any substantially lateral movement of the process car 102 resulting from the pushing of the car discharge cylinders 142 will be arrested by this car buffer 150. FIG. 10 also shows that the car buffer 150 has a substantially vertical side wall 150a for engagement with the process car 102 and 104 and a sloping side wall 150b distal to the process car 102. This slope side wall 150b serves as a slide for the sludge material discharged from the process car 102 and 104, directing the sludge material into the discharge pit 110.

Figure 9:
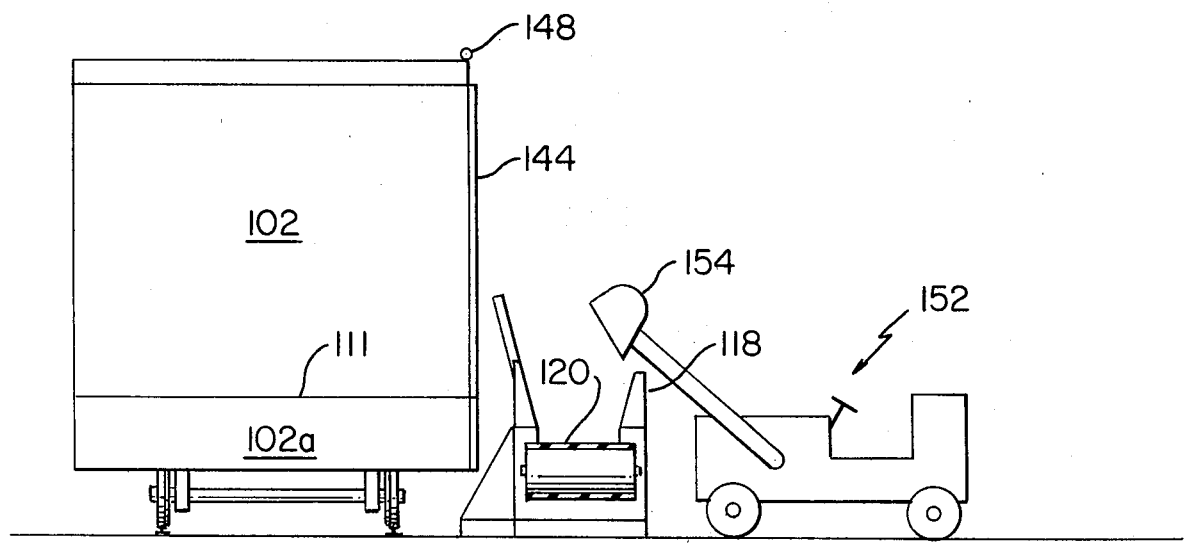
FIG. 9 is a sectional view, taken along line 9—9 in FIG. 7, depicting a front end loader dumping organic waste material into a live bottom hopper.

After being discharged from the process cars 102 or 104 into the discharge pit 110, the partially decomposed sludge is transported by way of a front end loader to the "live bottom" conveyor 118 wherein the processing cycle is commenced once again. A front end loader 152 for this use is schematically depicted in the illustration of FIG. 9. Its front end shovel 154 is lowered and advanced into discharge pit 110 wherein a large quantity of the partially decomposed organic waste material would be picked up. In the illustrated embodiment this quantity would generally be approximately three cubic yards of waste material. The material picked up in the front end shovel 154 would then be transported to "live bottom" hopper 118 into which the material would be dumped.

In order to insure even distribution of the waste material onto the shuttle conveyor 108 for discharge into the process cars 102 and 104, the speed of conveyor 120 is variable. Elevating conveyor 122, which receives material from conveyor 120, moves at a fixed speed which is faster than that of any of the variable speeds of conveyor 120. In this way, the speed of conveyor 120 may be regulated to uniformly distribute waste material on the elevating conveyor 122 without overloading elevating conveyor without heaping the material thereon.

Figure 11:
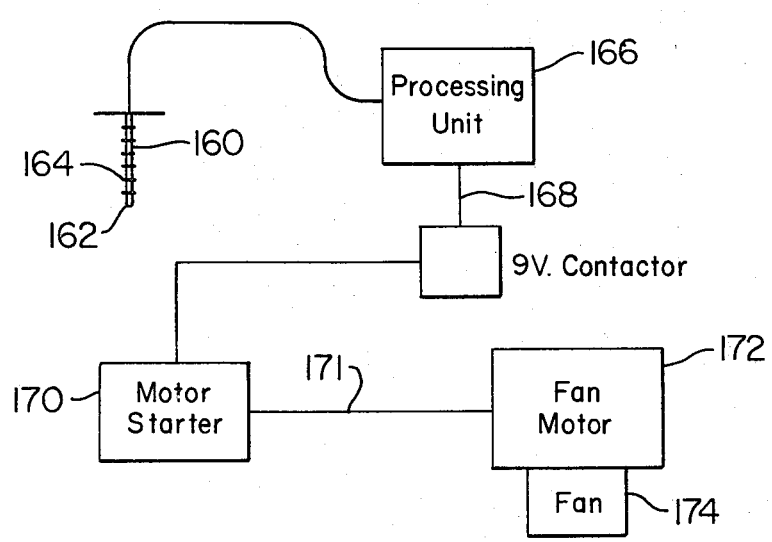
FIG. 11 is a schematic depiction of a control circuit to control air flow into the process cars in accordance to measured temperature conditions of the material contained within the process cars.

FIG. 11 is a schematic depiction of a control circuit for automatically operating fans for introducing pressurized air into the process cars via inlet conduit 80. A probe 130 is inserted either vertically or horizontally, into the organic sludge material of the process cars 20, 22, and 102 and 104. This probe 130 is a hollow tubular member with one closed end 132 and a plurality of apertures 134 at various lengths along the probe. A plurality of thermocouple wires extend through the various apertures and are exposed to the sludge material adjacent those apertures. These thermocouple wires generate signals representative of the temperature of the sludge at the various locations of the apertures and carry that signal as an input to a relay scanner processing unit 136, which includes a relay scanner and a ramp processor. The ramp processor used in the preferred embodiment is a Kaye Ramp Processor Model RP-ID, manufactured by Kaye Instruments, Inc. of Bedford, Mass.

When the probe 130 is vertically inserted into the sludge material, the processing unit 136 is supplied with a multitude of signals representative of temperature levels at various heights of the charge of sludge material. The processing unit 136 averages these input signals, and when the average level of the signal exceeds the predetermined value, generates a nine volt output signal along line 38 which, in turn, applies a 110 volt power source (not shown) to a motor starter 140. Four output lines, collectively represented by line 142, are output from the motor starter 140 and input to a 480 volt fan motor 142 which, when activated, turns a fan 144 to supply pressurized air to the conduit 80 and to the process cars 20, 22, and 102, 104. It is thus seen that the pressurized air supplied to aid in the decomposition of the organic sludge material is controlled as a function of the temperature of the sludge material.

Thus, it is apparent that there has been provided, in accordance with the invention, a method and apparatus that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for processing organic waste material in a series of repeated cycles, comprising:
   (a) a first processing station;
   (b) a loading assembly positioned at the first processing station for charging organic waste material;
   (c) a second processing station;
   (d) movable containment means for receiving a charge of organic waste material from the loading assembly and storing the organic waste material in a quiescent state as the waste material undergoes aerobic decomposition, said movable containment means being operative to transport the organic waste material from the first to the second processing stations;
   (e) means for introducing pressurized air into the organic waste material to augment the growth of thermophilic bacteria as the waste material stored in the containment means undergoes decomposition;
   (f) means for discharging the partially decomposed organic waste material from the containment means at the second processing station and mixing the organic waste material with the ambient air; and
   (g) means extending from the second to the first processing station for transferring the discharged organic waste material back to the loading assembly independently of the containment means whereby the partially decomposed material may be recharged into the movable containment means.

2. An apparatus as recited in claim 1 wherein the movable containment means is supported upon a track for movement between said first and second stations.

3. An apparatus as recited in claim 2 wherein said movable containment means is a process car rollably movable upon said track.

4. An apparatus as recited in claim 3 wherein said process car includes a base and a movable containment portion supported upon said base, at least a portion of said containment portion being movable relative to said base for discharging organic waste material from the process car.

5. An apparatus as recited in claim 4 wherein said containment portion is pivotally attached to said base.

6. An apparatus as recited in claim 5 further including means for pivotally moving said containment portion relative to said base for discharging organic material from said process car.

7. An apparatus as recited in claim 6 wherein said pivotally moving means includes a hoist positioned above said process car and connected thereto.

8. An apparatus as recited in claim 7 wherein said hoist is movably mounted upon a rail extending over said process car in transverse relationship to said track, said hoist having a cable which is retractable connected to said process car.

9. An apparatus as recited in claim 8 wherein said containment portion includes two end walls and two parallel side walls mutually perpendicular to said end walls, said side walls extending substantially parallel to said track.

10. An apparatus as recited in claim 9 wherein said containment portion of said porcess car is pivotally mounted to said base proximal to one of the side walls, said one side wall being hingingly secured to said end walls for opening when said containment portion is pivotally moved relative to said base portion.

11. An apparatus as recited in claim 10 wherein said containment portion is pivotally connected to the base proximal to the bottom of the containment portion and the one side wall is hingingly secured to the end walls proximal to the top of the containment portion.

12. An apparatus as recited in claim 11 wherein said means for transferring the discharged organic waste material back to the loading station includes an elevating conveyor.

13. An apparatus as recited in claim 12 further including a storage hopper positioned below the most elevated position of the elevating conveyor, said elevating conveyor extending through the storage hopper for removing organic waste material deposited therein and transporting it toward the process car.

14. An apparatus as recited in claim 13 wherein the loading assembly includes a shuttle conveyor, said shuttle conveyor receiving organic waste material from the elevating conveyor and being reciprocally movable toward and away from said process car for depositing organic waste material therein.

15. An apparatus as recited in claim 14 wherein the reciprocal movement of the shuttle conveyor toward and away from said process car is substantially perpendicular to the track and varies the discharge position of the shuttle conveyor through a zone defined by the vertical planes of the side walls of the process car when the process car is located at the first processing station.

16. An apparatus as recited in claim 1 wherein said means for introducing pressurized air includes a perforated false bottom in the containment means.

17. An apparatus as recited in claim 16 wherein said means for introducing pressurized air includes an open chamber disposed beneath the perforated false bottom.

18. An apparatus as recited in claim 17 wherein said means for introducing pressurized air includes an air conduit extending into said chamber, wherein pressurized air in said chamber is communicated through the perforations in said false bottom and into the organic waste material in the process car.

19. An apparatus as recited in claim 18 further including a layer of gravel upon said perforated false bottom, said gravel layer being interposed between said false bottom and organic waste material contained in the process car.

20. An apparatus as recited in claim 4 wherein said process car includes two end walls and two parallel side walls mutually perpendicular to said end walls, said side walls extending substantially parallel to said track.

21. An apparatus as recited in claim 20 further including a way system on said base, one of said side walls being movable toward the opposite side wall while maintaining a substantially perpendicular relationship to both the base and the end walls.

22. An apparatus as recited in claim 21 further including a piston cylinder arrangement disposed alongside said track opposite the second processing station, said piston cylinder arrangement being operative to move said one side wall toward the opposite side wall.

23. An apparatus as recited in claim 22 wherein the opposite side wall is hingingly secured to the end walls and movable about this hinged connection in response to movement of the one side wall.

24. An apparatus as recited in claim 23 wherein the hinged connection is proximal to the top of the process car.

25. An apparatus as recited in claim 4 wherein said containment portion of said process car includes two end walls spaced by approximately twenty feet.

26. An apparatus as recited in claim 25 wherein said containment portion further includes two side walls spaced by approximately twelve feet.

27. An apparatus as recited in claim 26 wherein the end walls and the side walls extend approximately 10 feet above said base.

* * * * *